United States Patent [19]

Van Thuijl et al.

[11] Patent Number: 5,019,926

[45] Date of Patent: May 28, 1991

[54] MAGNETIC-HEAD UNIT INCLUDING ROTARY AND STATIONARY TRANSFORMER SECTIONS AND AMPLIFIER ARRANGEMENT

[75] Inventors: Joannes G. M. Van Thuijl; Aart T. Van 'T Veld, both of Eindhoven, Netherlands

[73] Assignee: U.S. Philips Corporation, New York, N.Y.

[21] Appl. No.: 337,015

[22] Filed: Apr. 12, 1989

[30] Foreign Application Priority Data

Apr. 22, 1988 [NL] Netherlands ................. 8801049

[51] Int. Cl.⁵ ................. G11B 33/14; G11B 5/52
[52] U.S. Cl. ................. 360/84; 360/130.24; 360/108; 360/130.22; 360/107
[58] Field of Search .......... 360/108, 109, 84, 95, 360/130.22, 130.23, 77.02, 73.03, 130.24, 107, 104

[56] References Cited

U.S. PATENT DOCUMENTS

| | | | |
|---|---|---|---|
| 3,995,317 | 11/1976 | Schmidt | 360/109 |
| 4,509,084 | 4/1985 | Fujioka et al. | 360/107 |
| 4,654,738 | 3/1987 | Kato et al. | 360/130.24 |
| 4,823,211 | 4/1989 | Schulz et al. | 360/108 |
| 4,829,401 | 5/1989 | Vranken | 360/108 |
| 4,891,726 | 1/1990 | Suwa et al. | 360/130.23 X |

FOREIGN PATENT DOCUMENTS

| | | | |
|---|---|---|---|
| 59-218602 | 12/1984 | Japan. | |
| 61-104415 | 5/1986 | Japan | 360/103 |
| 61-104418 | 5/1986 | Japan | 360/84 |
| 61-236014 | 10/1986 | Japan | 360/130.24 |
| 62-16204 | 1/1987 | Japan | 360/130.24 |
| 63-181101 | 7/1988 | Japan | 360/130.24 |
| 2149955 | 6/1985 | United Kingdom | 360/130.22 |

*Primary Examiner*—Robert S. Tupper
*Assistant Examiner*—Alfonso Garcia

[57] ABSTRACT

A magnetic-head unit (1) is disclosed which includes a lower and an upper drum (3, 4), between which a rotary head disc (17) is interposed, which disc carries a plurality of magnetic heads (18). The magnetic heads (18) are electrically connected to a transformer comprising a rotary transformer section (8) and a stationary transformer section (10), the stationary transformer section (10) being connected to an amplifier arrangement (16) accommodated in a shielding cover (14, 15). The stationary transformer section (10) is arranged near the upper side of the upper drum (4), a bridge construction (11) being arranged externally of the magnetic-head unit (1) to secure the stationary transformer section (10) to the frame (2) of the magnetic-head unit. The amplifier arrangement (16) is situated inside the shielding cover (14, 15) in the direct proximity of the stationary transformer section (10).

4 Claims, 2 Drawing Sheets

MAGNETIC-HEAD UNIT INCLUDING ROTARY AND STATIONARY TRANSFORMER SECTIONS AND AMPLIFIER ARRANGEMENT

The invention relates to a magnetic-head unit comprising a frame and a lower and an upper drum, which together define a tape-guide surface at their periphery for guiding a magnetic tape, between which lower and upper drum a rotary head disc is interposed, which head disc carries a plurality of magnetic heads, which are electrically connected to a transformer comprising a rotary transformer section and a stationary transformer section, the stationary transformer section being connected to an amplifier arrangement which is surrounded by a shielding cover.

Such a magnetic-head unit is known from the document EP-0,209,195 A2. In this prior-art magnetic-head unit the transformer sections are accommodated in a pot-shaped construction arranged inside the lower drum, the rotary transformer section being situated beneath the underside of the head disc. The distance between the transformer and an amplifier arranged above the drum system is therefore comparatively large. As a result of this, the electrical connection between the transformer and the amplifier is susceptible to the influence of spurious signals.

The document DE-B-24 30 893 discloses a magnetic unit in which the transformer is situated inside the upper drum at some distance below the top of this upper drum. In this prior-art magnetic-head unit the upper drum is mounted on a shaft which projects above the upper drum and which is secured by means of a nut, which does not allow the transformer to be mounted higher in the magnetic-head unit and hence closer to the amplifier.

It is an object of the invention to arrange the transformer in the connection between the magnetic heads and the amplifier in a magnetic-head unit of the type defined in the opening paragraph as close as possible to the amplifier situated above the head unit.

To this end the invention is characterized in that the stationary transformer section is arranged near the upper side of the upper drum, a bridge construction being arranged externally of the magnetic-head unit to secure the stationary transformer section to the frame of the magnetic-head unit, the amplifier arrangement being situated inside the the shielding cover in the direct proximity of the stationary transformer section.

By arranging the transformer with the stationary transformer section at the upper side of the upper drum and employing fixing means using a bridge construction at the outside of the magnetic-head unit it is possible to arrange the transformer in the direct proximity of the amplifier, which is accommodated in a shielding cover and is supported by the bridge construction. This minimizes the distance between the transformer and the amplifier, which reduces the susceptibility of the electrical connection to spurious signals to a minimum and which reduces the capacitance of the electrical connection, so that a better matching of the amplifier is possible.

Moreover, the amplifier can be integrated with the stationary transformer section, enabling a compact construction of the magnetic-head unit to be obtained. The bridge construction enables the cover for the amplifier and the stationary transformer section to be made of a metal or a plastic, which results in a favorable mechanical construction and a satisfactory shielding against spurious signals. It may be advantageous to provide said metal with an electrically conductive layer. The upper side of the construction may be formed by a lid for a satisfactory accessibility. The surface on the inner side of the cover may be constructed as a printed-circuit board for the amplifier.

In a preferred embodiment the magnetic-head unit in accordance with the invention is characterized in that the dimension of the transformer sections, viewed in a radial direction from the axis of rotation of the head disc, is such that said sections extend into the proximity of the tape-guide surface of the lower and the upper drum. This yields the advantage that comparatively large transformer surfaces are available. When a plurality of magnetic heads and, consequently, a plurality of channels are used this enables more ferrite to be used per channel, so that the inductance can remain the same despite the use of more channels. The use of comparatively large transformer surfaces yields advantages such as an improved signal transfer in conjunction with a higher efficiency, improved inter-channel crosstalk attenuation, and an improved signal-to-noise ratio. The construction of the transformer in the magnetic-head unit makes it possible for the transformer sections to extend beyond the diameter of the magnetic-head unit, so that the surface area of the facing transformer sections is not limited by the outer diameter of the lower and the upper drum.

In conjunction with the foregoing a further preferred embodiment is characterized in that the transformer sections partly extend perpendicularly to the axis of rotation of the head disc and are partly coaxial with said axis of rotation. The coaxial arrangement of part of the transformer sections enables the surface area of the transformer sections to be increased even further. This enables signals of a plurality of channels to be transmitted while maintaining the said advantages.

Another prefered embodiment of a magnetic-head unit is characterized in that for earthing the upper drum an earthing spring is provided, which spring extends from the bridge construction to a bearing plate situated in the proximity of the stationary transformer section. The use of an earthing spring arranged in this way makes it possible to obtain a satisfactory earthing while maintaining a short distance between the transformer and the amplifier.

In connection with this yet another preferred embodiment of a magnetic-head unit is characterized in that an axial bearing is arranged near the upper side of the stationary transformer section, a pressure member arranged near the free end of said earthing spring exerting pressure on said axial bearing. Such a construction also enables the distance between the transformer and the amplifier to be minimized.

Embodiments of the invention will now be described in more detail, by way of example, with reference to the accompanying drawings. In the drawings.

Figure 1:
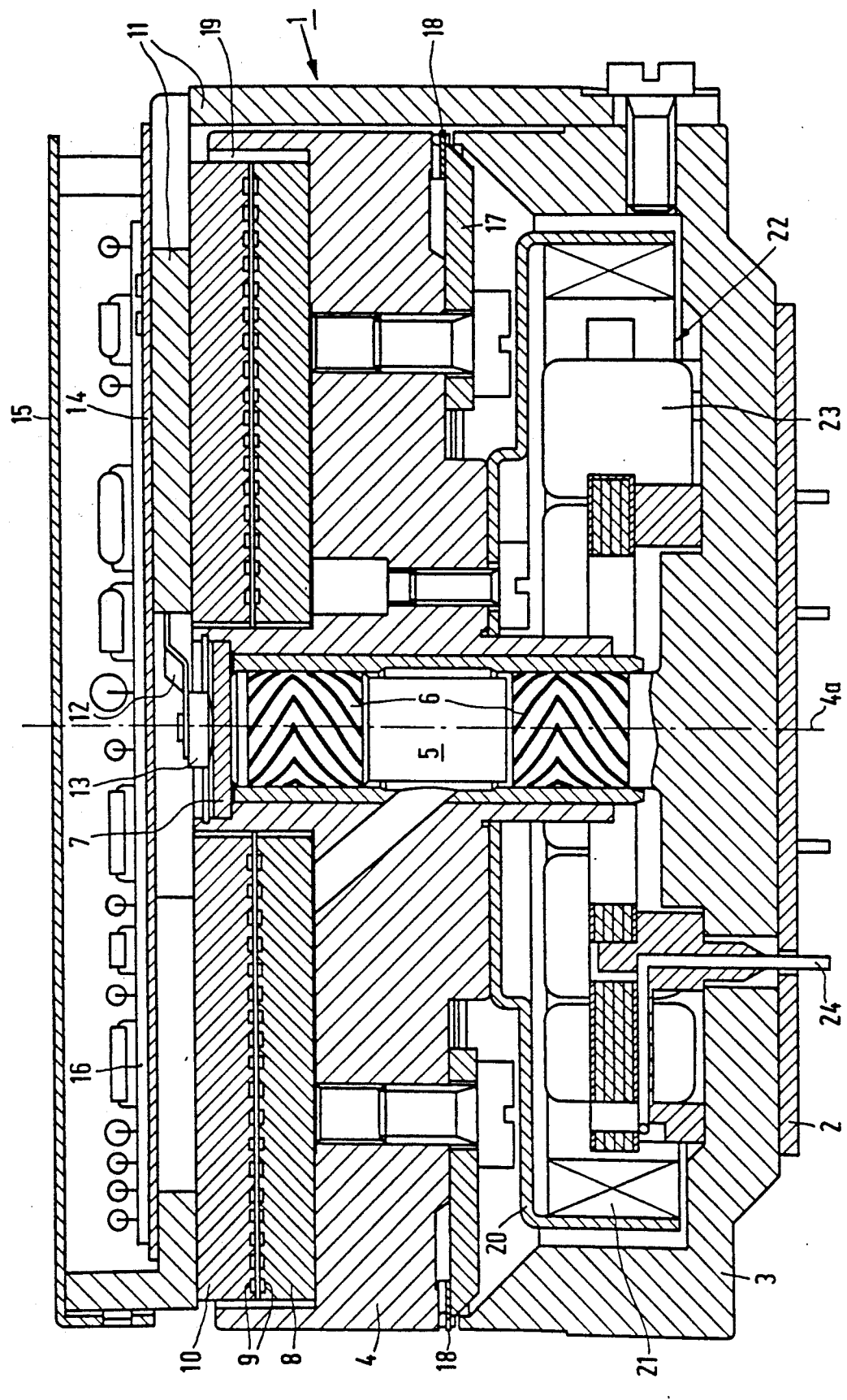
FIG. 1 is a sectional view of a magnetic-head unit in accordance with the invention provided with a cover accommodating an amplifier.

The magnetic-head unit 1 shown in FIG. 1 comprises a cylindrical drum system comprising a lower drum 3, which is fixedly connected to a frame constituted by a deck plate 2, and a rotatable upper drum 4 having an axis of rotation 4a. The upper drum 4 is rotatably supported on a shaft 5 which is fixedly connected to the lower drum 3 and which extends up to a short distance from the upper side of the upper drum 4. The shaft 5 is formed with pump grooves 6 acting as a helical-groove bearing. At the upper end of the shaft 5 a thrust-bearing plate 7 is arranged, which plate is also formed with helical grooves and is fixedly connected to the upper drum 4. The upper drum 4 further carries a transformer section 8 which is provided with transformer windings 9 at its upper side. An air gap, which is small measured in the axial direction, is formed between the upper side of the transformer section 8 and a superposed stationary transformer section 10. The transformer section 10 is also provided with transformer windings 9. The transformer section 10 is fixedly connected to a bridge construction 11, which is situated partly above the upper drum and which extends downwardly from the upper side of the drum system adjacent this system and which is connected to the lower drum 3 by bolt means near the lower part of the drum system. The bridge construction carries an earthing spring 12, which near its free end is connected to a pressure member 13 and presses this member against the bearing plate 7. In this way the pressure member 13 exerts pressure on the plate 7, thereby earthing the upper drum 4. The bridge construction 11 carries a shielding plate 14 which in conjunction with an upper plate 15 constitutes a shielding cover which accommodates an amplifier arrangement comprising an amplifier board 16 provided with electronic components. In a manner not shown the amplifier board is connected to the windings 9 of the transformer section 10. For the invention it is important that the amplifier board 16 is situated at a comparatively small distance from the transformer section 10; in fact, only the earthing spring 12 is arranged between the shielding plate 14 and the transformer section 10. The plate 14 may be provided with an electrically conductive layer, enabling the amplifier board 16 to be integrated with the plate 14. At its lower side the upper drum 4 is connected to an annular head disc 17 carrying a plurality of magnetic heads 18 near its periphery. For example, four heads may be equidistantly spaced along the circumference, but it is also possible to provide another number of heads. The free ends of the magnetic heads 18 are situated adjacent the outer circumference of the drum system. As a result of the arrangement of the transformer sections 8 and 10 in a cavity 19 of the upper drum 4 it is possible for the transformer sections to extend in a radial direction from the vicinity of the bearing means of the drum section 4 into the area near the periphery of the drum system, where the tape-guide surface common to the lower and the upper drum is situated. At the underside the upper drum 4 is further equipped with a carrier plate 20 comprising coaxially arranged carrier portions to which permanent magnets 21 are secured. These magnets form part of a motor 22, which in addition to the magnets 21 comprises a stator 23 comprising a lamination assembly with coils. The connecting wires to the motor bear the reference numeral 24.

An important constructional feature of the magnetic-head unit 1 is the pot shape of the lower drum 3, in which the motor 23 is arranged, which has the advantage that a small overall height is obtained. The arrangement of the stationary transformer section 10 at upper side of the upper drum 4 has the advantage, as already stated, of a short distance relative to the amplifier board 16, resulting in a short electrical connection between the transformer section and the amplifier. This effectively precludes parasitic influences on this connection. This short distance in conjunction with the comparatively large area of cooperation between the transformer sections 8 and 10 further yields the advantage that a large bandwidth can be achieved for the signal transfer from the heads 18 to the amplifier. This is of advantage in particular when a large number of magnetic heads 18 is used. Moreover, this provides an improved signal-to-noise ratio.

The drum system 1 can be manufactured as a compact unit, which has the advantage that the resulting drum system can easily be mounted in a magnetic recording/reproducing apparatus, such as a video recorder or a digital audio recorder.

Since it is possible to use a large number of magnetic heads in such apparatuses more signal channels are available, which has the advantage of a more extensive field of use, such as in modern video recorders for where, in addition to a high video quality, high-quality audio recording and a satisfactory interchannel-crosstalk attenuation are desirable.

Figure 2:
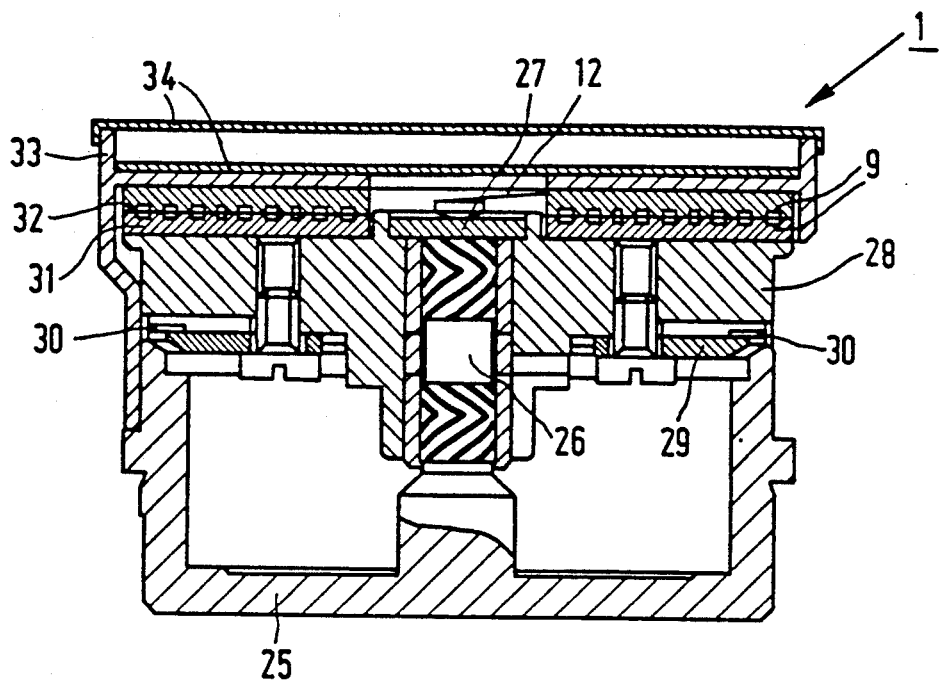
FIG. 2 is a reduced-scale sectional view showing a second embodiment of the magnetic-head unit in accordance with the invention.

The second embodiment shown in FIG. 2 is a magnetic-head unit 1 employing a pot-shaped stationary lower drum 25 having a fixed shaft 26. This shaft 26 is provided with a helical-groove bearing and at the top it is covered by a bearing plate 27, which is fixedly connected to a rotary upper drum 28 which at the lower side carries a head disc 29 provided with a plurality of magnetic heads 30. At its upper side the upper drum 28 carries a transformer section 31 comprising windings 9, a stationary transformer section 32 being arranged above the transformer section 31 and being fixedly connected to the lower drum 25 by means of a bridge construction 33, in the same way as in the preceding embodiment. Again an earthing spring 12 is employed, the bridge construction 33 carrying a cover 34 which is constructed substantially in the same way as the cover comprising the plates 14 and 15 in the preceding embodiment. An amplifier board is arranged in this cover in the same way as in FIG. 3. The present embodiment differs from that shown in FIG. 1 in that the transformer sections 31 and 32 extend from the bearing means in a radial direction beyond the circumference of the drum system. In this way the diameter of the transformer sections is not restricted by the outer diameter of the drum system. The present embodiment enables signals to be transferred from the magnetic heads 30 via large number of channels, each associated with a magnetic head, while all the advantages of the preceding embodiment are maintained.

Figure 3:
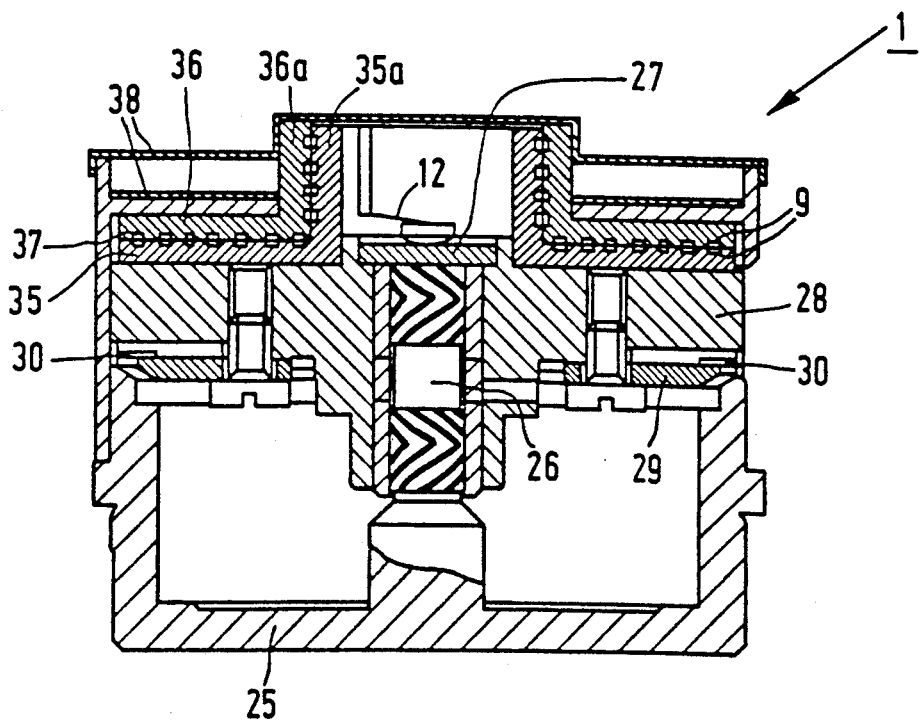
FIG. 3 is a sectional view similar to FIG. 2 and showing a third embodiment of a magnetic-head unit in accordance with the invention.

The embodiment shown in FIG. 3 is a magnetic-head unit 1 comprising a number of parts of identical construction and bearing the same reference numerals as in the preceding embodiments. At its upper side the rotary upper drum 28 carries a transformer section 35 which, in addition to a part which extends perpendicularly to the axis of rotation of the heads 30, comprises a coaxial part 35a in the proximity of the bearing means. Substantially the entire surface area of the transformer section 35 is provided with windings 9. The rotary transformer section 35 cooperates with a stationary transformer section 36 having a shape similar to that of the transformer section 35 and, consequently, comprising a part which extends perpendicularly to the axis of rotation and a coaxial part 36a. Again the stationary transformer section 36 is connected to the lower drum 25 by means of a bridge construction 37. The bridge construction is similar to the bridge construction 11 in the embodiment shown in FIG. 1. Around the stationary transformer section 36 a cover 38 is arranged to accommodate an amplifier. In addition to the afore-mentioned advantages, a great advantage of this construction is that a large area can be obtained between the two transformer sections 35 and 36. Again (though this is not shown) the transformer sections may extend beyond the circumference of the drum system. This embodiment also has the advantage of a short distance between the amplifier situated in the cover and the transformer sections. It is to be noted that in a manner not shown the stationary transformer section in the preceding embodiment can be integrated with the amplifier cover, enabling an even more compact construction of the magnetic-head unit to be obtained.

We claim:

1. A magnetic-head unit comprising a frame (2) and a lower and an upper drum (3, 4; 25, 28), which together define a tape-guide surface at their periphery for guiding a magnetic tape, which upper drum includes upper and lower sides and between which lower and upper drum a rotary head disc (17, 30) is interposed, which head disc is capable of rotating about an axis of rotation (4a) and carries a plurality of magnetic heads (18), which are electrically connected to a transformer comprising a rotary transformer section (8,; 31; 35) and a stationary transformer section (10; 32; 36), the stationary transformer section being connected to an amplifier arrangement (16) which is surrounded by a shielding cover (14, 15; 34; 38), characterized in that the stationary transformer section (10; 32; 36) is arranged above the upper side of the upper drum (4; 29), a bridge construction (11; 33; 37) is provided which serves to secure the stationary transformer section to the frame (2) of the magnetic-head unit, the amplifier arrangement (16) is situated inside the shielding cover (14, 15; 34, 38) adjacent the stationary transformer section, and a dimension of the rotary and stationary transformer sections (8, 10; 31, 32; 35, 36), viewed in a radial direction from the axis of rotation (4a) of the head disc (17; 30), is such that a radial extent of said sections is greater than half the radial distance from said axis of rotation to, and said sections extend beyond, the tape-guide surface of the lower and the upper drum (3, 4; 25, 28).

2. A magnetic-head unit as claimed in claim 1, characterized in that the transformer sections (35, 36) include portions which extend perpendicularly to the axis of rotation (4a) of the head disc (30) and portions (parts 35a, 36a) which are coaxial with said axis of rotation.

3. A magnetic-head unit as claimed in claim 1, characterized in that for earthing the upper drum (4; 28) an earthing spring (12) is provided, which spring extends from the bridge construction (11) to a bearing plate (7) situated in the proximity of the stationary transformer section (10).

4. A magnetic-head unit as claimed in claim 3, the head disc (17) being journalled on a shaft (5) which is mounted stationarily relative to the frame (2) of the magnetic-head unit (1), characterized in that an axial bearing is arranged near the upper side of the stationary transformer section, a pressure member (13) arranged near the free end of said earthing spring exerting pressure on said axial bearing.

* * * * *